United States Patent [19]
Mitchell

[11] 3,868,060
[45] Feb. 25, 1975

[54] CAMPER HEATING SYSTEM

[76] Inventor: John C. Mitchell, 2572 Elysium Ave., Eugene, Oreg. 97401

[22] Filed: Sept. 19, 1973

[21] Appl. No.: 398,647

[52] U.S. Cl....... 237/12.3 B, 126/350 A, 296/23 R, 165/41
[51] Int. Cl.............................................. B60h 1/04
[58] Field of Search.......... 237/12.3 B, 8 A, 12.3 R; 126/350 A, 19.5; 62/299; 296/23 R; 165/41

[56] References Cited
UNITED STATES PATENTS

| | | | |
|---|---|---|---|
| 1,936,062 | 11/1933 | Masury | 165/43 |
| 2,530,241 | 11/1950 | Harrington | 62/239 X |
| 2,732,133 | 1/1956 | Lintern | 237/12.3 B |
| 3,381,316 | 5/1968 | Anderson | 237/12.3 R |
| 3,507,322 | 4/1970 | Tetrick et al. | 62/299 X |

*Primary Examiner*—William E. Wayner
*Attorney, Agent, or Firm*—James D. Givnan, Jr.

[57] ABSTRACT

A heating system including a portable heater removably installed within a camper unit. Said heater utilizing heated engine coolant in communication with the trucks cooling system by quick-release type couplings with permanently mounted coupling members secured to the truck bed and receiving detachable coupling members associated with the heater.

1 Claim, 5 Drawing Figures

3,868,060

CAMPER HEATING SYSTEM

BACKGROUND OF THE INVENTION

The present invention relates generally to heating systems for vehicles and particularly to such a system for use with a truck carried camper unit removably mounted within the truck box.

The term camper is commonly applied to a structure constituting living quarters transportable within the box of a pick-up truck. Camper structures are of unitary construction and may be loaded and unloaded from the truck box permitting the truck to be used in its normal manner. Camper units at present, rely for the most part on self-contained catalytic or fueled heaters which may be used only when the camper is stationary. Occupants of the camper during over the road travel are subjectted to prevailing outside temperatures and accordingly camper use during months other than those having mild temperatures is limited. As camper units are often occupied during travel by young children the use of any combustion or catalytic heater incurs substantial risks.

SUMMARY OF THE INVENTION

The present invention is embodied within a system which permits the engine coolant to serve as the heating medium yet avoids the inconvenience as would be incurred with conventional automotive heaters.

A heater unit includes a radiator core in combination with a portable enclosure which includes quick-release, self-sealing type fittings. Similar fittings are disposed adjacent the truck box which permits associated fluid conduits to be disconnected and removed without fluid loss or inconvenience. As camper units are installed and removed quite frequently from the truck box the present system is particularly advantageous in that it permits same without added complications.

An important object of the present invention is to provide a heating system used with a removably mounted camper unit which heretofore had to rely on combustion or catalytic heaters which are not suitable for use in a moving camper. The present system permits the engine coolant to be put readily in circuit with a portable heater unit within the camper for use while underway or parked without risk to occupants. Camper use during the colder months is entirely feasible.

A further important object is the provision of a heating system including a compact portable heater or heat exchanger which may be conveniently stowed aboard the camper unit or removed therefrom. In use, the heat exchanger is supported in a stable manner against swaying motion of the camper. Said unit in addition to a radiator core includes a powered fan and louvers for a regulated airflow of heated air.

A still further objective of the present invention is the provision of quick-release type couplings which permits manual connecting and disconnecting of fluid conduits without the loss of engine coolant from system components. Disconnect fittings are recessed within the truck bed to permit normal truck bed usage without the risk of damage to said fittings. Short conduit segments provide fluid flow to and from the heater and by reason of said fittings may be disconnected from truck mounted and heater unit fittings without fluid loss or spillage within the camper.

A further object of the present invention is to provide a source of heat for a camper unit which is: safe as opposed to combustion type heaters; regulated by a campers occupants; of attractive appearance; readily installed and removed from the camper without risk of spillage or loss of engine coolant.

DESCRIPTION OF THE PREFERRED EMBODIMENTS

Figure 1:
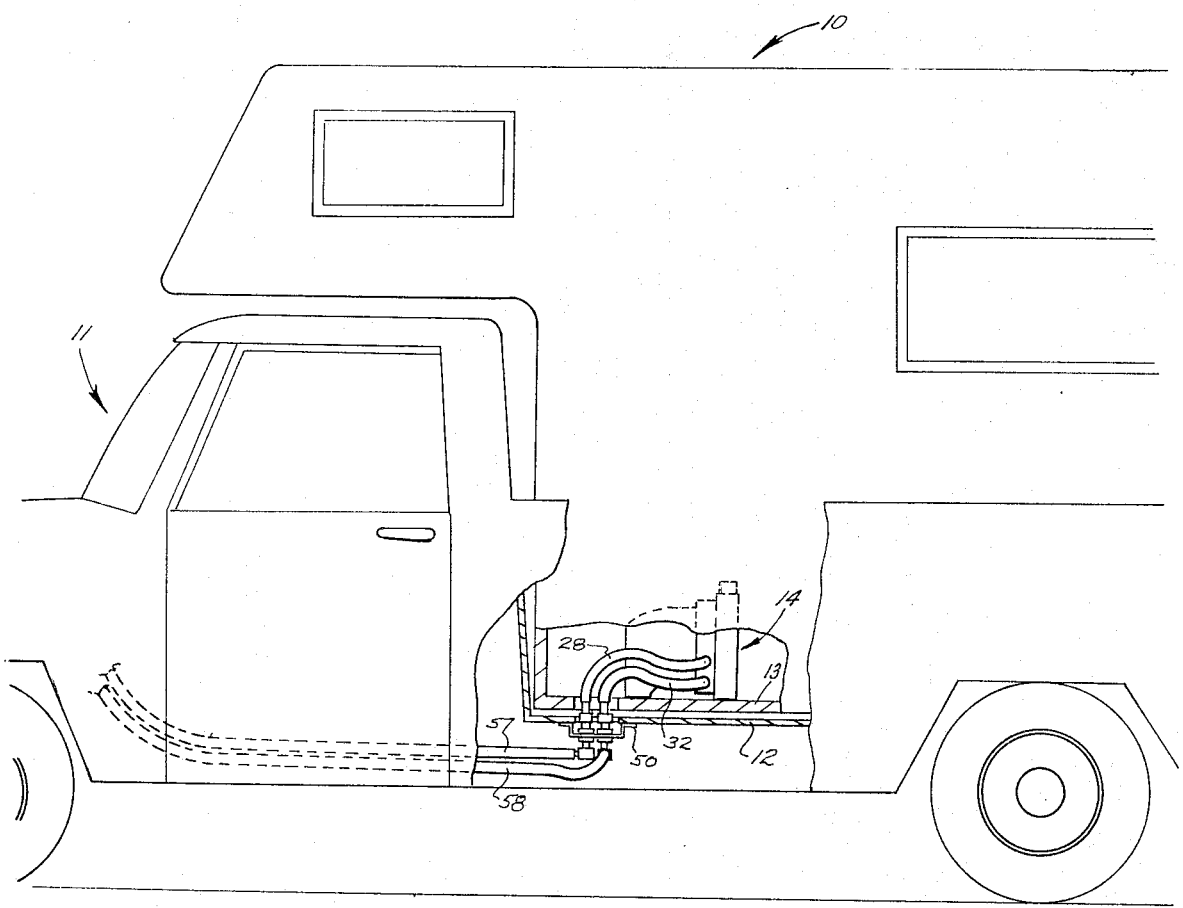
FIG. 1 is a side elevational view of a pick-up truck with a camper unit installed within the truck box.

In the accompanying drawings wherein reference numerals indicate parts similarly identified in the following description of the invention, the reference numeral 10 indicates generally a mobile living unit of the type temporarily positioned within the box of a truck 11 on a truck bed 12. Such living units are referred to by the public as campers and are quite popular for the reason that they may be removed from the truck bed to permit the truck to be returned to its normal utilitarian role.

Camper units include a floor structure 13 which rests upon the truck bed 12. Various apparatuses are commonly in use for the loading and unloading of camper units from turcks during which time the camper and truck bed 12 move with respect to one another in a close, passing relationship. Importantly in the present system, no obstructions depend from the camper floor 13 or project upwardly from truck bed 12 to impede such movement.

Figure 3:
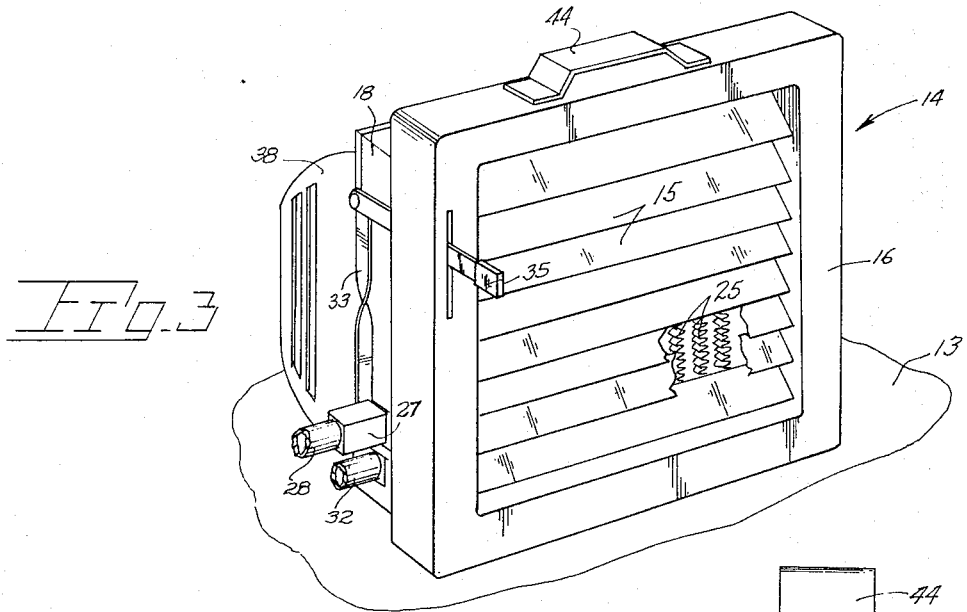
FIG. 3 is a perspective view of the heat exchanger used with the present invention.
Figure 4:
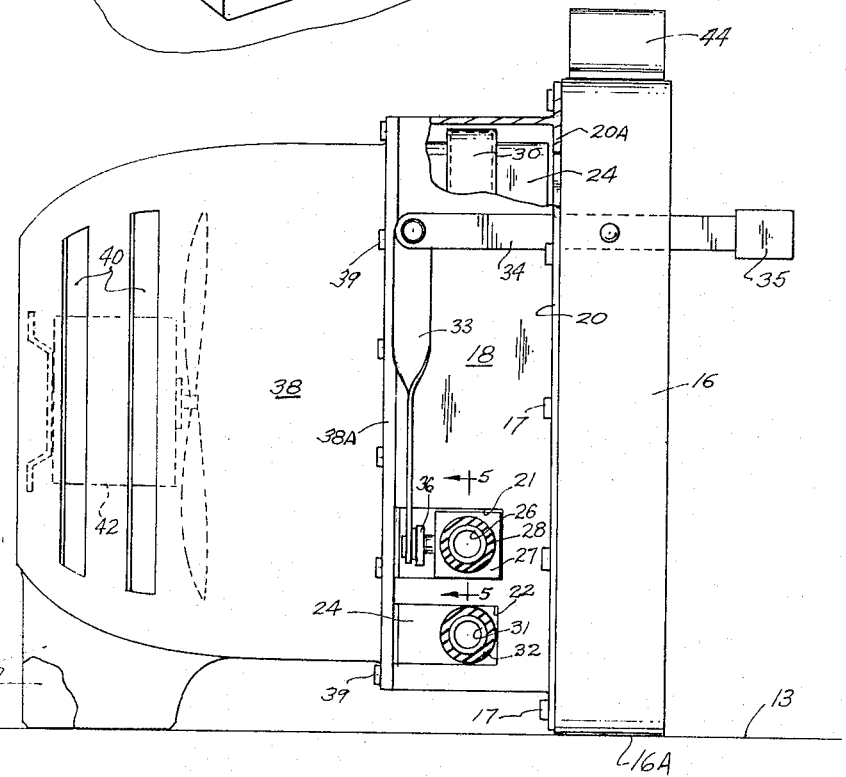
FIG. 4 is a side elevation view of the heat exchanger of FIG. 3.
Figure 5:
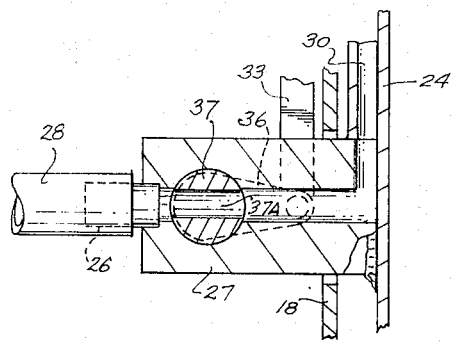
FIG. 5 is a sectional view of a valve body taken along line 5—5 of FIG. 4.

A heat exchanger or heater is indicated generally at 14 removably in place on the floor 13 of the camper for providing heated air within the camper interior. With attention to FIGS. 3 and 4, the heater 14 includes louvers 15 mounted within a frame 16 having a base 16A which supports the forward end of the exchanger. Secured to louver frame 16 by fasteners 17 is a radiator housing 18 (FIG. 4) flanged at 20 about its perimeter with an inwardly directed flange segment at 20A confining a later described radiator shell. Recessed areas at 21 and 22 formed in the housing 18 permit forward seating of radiator fittings also later described.

A radiator shell at 24 is confined within housing 18 by louver frame 16 and a later described fan housing, the shell including a radiator core 25 through heated fluid such as engine coolant flows. An inlet fitting at 26 for the radiator is integral with a valve 27 for regulating the incoming flow of engine heated fluid delivered via a conduit segment 28. The regulated flow is directed upwardly along the exterior of the shell 24 by a duct 30 which discharges into the upper end of the radiator shell. A fluid return fitting at 31 extends outwardly of radiator housing 18 through recessed area 22 to direct the fluid into a return conduit segment 32.

For permitting camper occupants to regulate fluid flow through the radiator core 25 and hence the amount of heat discharged in the camper, I provide a pivoted linkage at 33–34 whereby manual movement of a control 35 will swing a pitman 36 to rotate a valve body 37 within valve 27. A port 37A within the valve body thereby permits heated fluid to enter duct 30.

A molded fan housing 38 is affixed to flanged radiator housing 18 by screws 39 passing through a housing flange 38A. Air inlets 40 serve to admit air to a fan 41 powered by an electric motor 42 suitably secured to the interior of fan housing 38. A pair of widely spaced supports 43 are in rested support on the camper floor 13 while the forward end of heater 14 is supported by the lowermost side 16A of louver frame 16. For the sake of portability, a handle 44 is secured to louver frame 16 which handle may be otherwise located to facilitate carrying.

Figure 2:
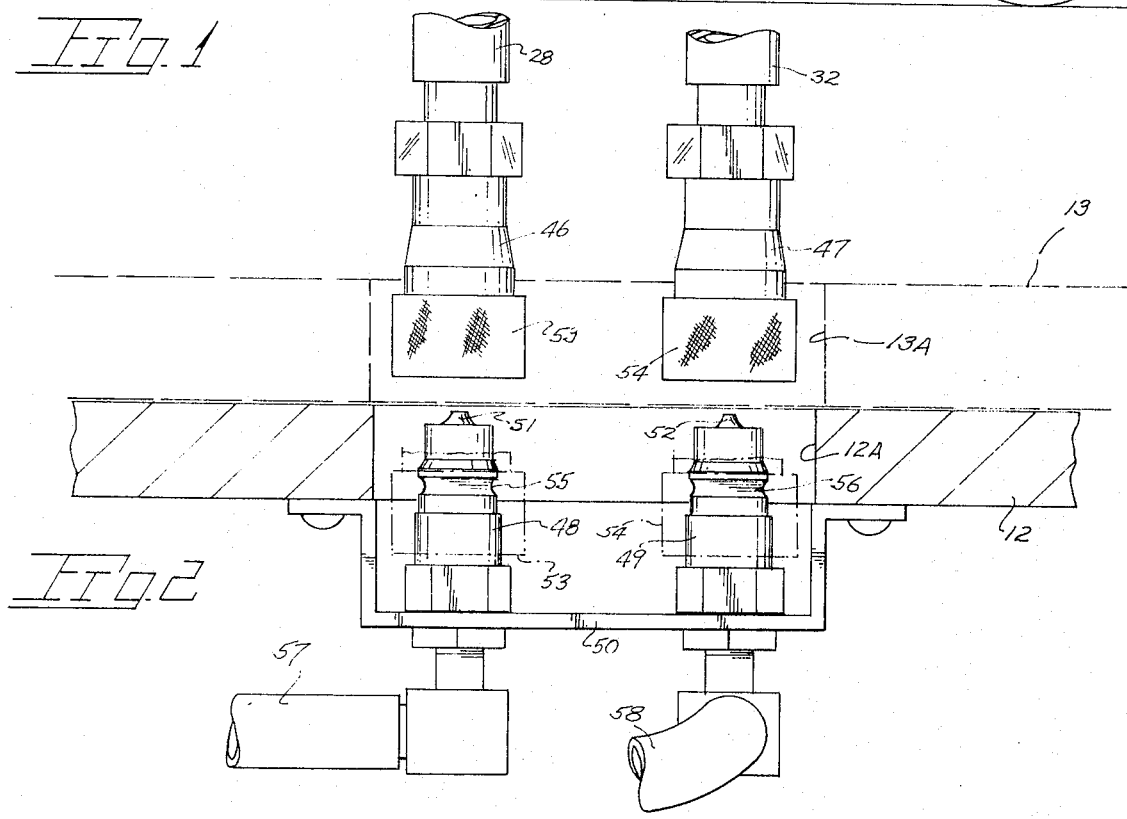
FIG. 2 is an enlarged detail view of a fragment of the truck bed with stationary fluid coupling members installed therebelow.

With attention to FIGS. 1 and 2, a heater unit 14 is shown operatively disposed within a camper and served by a pair of fluid conduit segments 28 and 32. Each of said conduit segments is equipped with quick-release type female fittings 46–47 at their opposite ends for cooperation with male fittings 48–49. The term quick-release used in conjunction with conduit couplings is understood to identify that class of fluid couplings which are intended for connection without the aid of tools and which rely on spring biased components to effect automatically a desired seal against fluid leakage upon disconnection of the fittings. One such female-male coupling is manufactured by the Aeroquip Corporation and bears Part Nos. 5601-6-6S; 5602-6-6S for both pneumatic and fluid purposes. Such couplings are shown in the drawings wherein male coupling members 48–49 are mounted on a bracket 50 secured to the underside of a truck bed 12. Each member 48–49 includes a valve core 51–51 biased by internal spring components not shown to a closing position whereby when uncoupled, the members 48–49 are sealed against fluid flow.

Female members 46–47 include slidable collars 53–54 which are spring urged downwardly to act upon a series of circumferentially spaced apart ball elements which seat within annular grooves 55–56 in the male members for retention of coupled fittings in joined engagement. The female members additionally include O-rings which seat about cylindrical end portions of the male members to assure fluid tight engagement. Coupling members 46–47 also are self-sealing upon disconnection from male members 48–49.

Female members 46–47 at the ends of the heater hose segments 28 and 32 pass through an opening 13A formed in the camper floor 13 and may be coupled or uncoupled from the male coupling members 48–49 by manual effort alone without the use of tools. Such manual coupling and uncoupling is an inherent feature in the above described quick-release type couplings. The opening 13A is a size to permit convenient manual coupling and uncoupling from the camper interior.

Hose lengths at 57–58 are connected respectively to the trucks heater hose by means of a T-connection while hose 58 may be similarly connected to the trucks heater return hose.

In operation the heat exchanger 14 is installed within the camper after placement of the latter within the truck box. Opening 13A in the camper bottom wall is located in register with an opening 12A in the truck bed to permit manual coupling of the quick-release coupling members. At any time, if unneeded, the heater 14 may be removed by uncoupling of said members without loss of coolant or spillage onto the camper floor.

While I have shown but one embodiment of the invention it will be apparent to those skilled in the art that the invention may be embodied still otherwise without departing from the spirit and scope of the invention.

Having thus described the invention, what it desired to be secured under a Letters Patent is:

1. A heating system for a truck mounted camper unit of the type removably mounted within the truck box, said system comprising, a portable fluid to air heat exchanger including fan means, an enclosure for said fan means, inlet and outlet fittings, flexible inlet and outlet conduit segments serving the heat exchanger, valve means for regulating fluid flow through said segments and the heat exchanger, quick-release coupling members of the self-sealing type, means mounting said quick-release coupling members in a recessed manner below the camper supporting surface of the truck bed and serviced by hoses in communication with the trucks engine cooling system.

additional quick-release coupling members carried by said flexible inlet and outlet conduit segments for coupling with said mounted coupling members through an opening in a camper wall whereby the heat exchanger may be put into fluid circuit with the trucks cooling system subsequent to installation of the camper in the truck box or alternately uncoupled and removed from the camper without loss of engine coolant.

* * * * *